United States Patent [19]

Flint

[11] 4,268,170
[45] May 19, 1981

[54] MULTI-PATH MONOCHROMATOR

[75] Inventor: Bruce K. Flint, Lancaster, Mass.

[73] Assignee: Acton Research Corporation, Acton, Mass.

[21] Appl. No.: 76,612

[22] Filed: Sep. 18, 1979

[51] Int. Cl.³ .................................................. G01J 3/18
[52] U.S. Cl. .................................... 356/334; 356/328; 350/290
[58] Field of Search ............... 356/328, 329, 332, 334, 356/333

[56] References Cited

U.S. PATENT DOCUMENTS 3,216,313 11/1965 Chisholm ............................ 356/334
4,022,531 5/1977 Orazio et al. ........................ 356/332

Primary Examiner—Vincent P. McGraw
Attorney, Agent, or Firm—James H. Grover

[57] ABSTRACT

A monochromator has three ports or slits including two entrance slits and an exit slit. A single mirror and a diffraction grating define a first, folded path between an entrance slit on one side of the housing and an exit slit on the opposite side of the housing. The mirror is movable in and out of a second path between the second entrance slit and the grating so that a second path may be completed from the second entrance slit to the grating and thence to the exit slit. Alternatively two of the ports may be used as exit slits and one as an entrance slit.

3 Claims, 2 Drawing Figures

MULTI-PATH MONOCHROMATOR

BACKGROUND OF THE INVENTION

This invention relates to monochromators in which light from a source is diffracted in a spectrum and a narrow light wavelength is directed through an exit slit for example to measure the transmission of a specimen at that wavelength.

The object of the present invention is to provide a monochromator which increases the range of available wavelengths on the one hand, or which increases the number of specimens which may be examined by a light source.

SUMMARY OF THE INVENTION

According to the invention a monochromator comprises a housing having at least three ports including at least one entrance and one exit port; and a diffraction grating and a single reflector defining a first folded path between two of said ports on opposite sides of the housing, the reflector intercepting a second path from the third of said ports to the grating at an angle to the first path, and the reflector being movable out of the second path to complete the second path directly to the grating and thence to one of the first two ports.

DRAWINGS

DESCRIPTION

Figure 1:
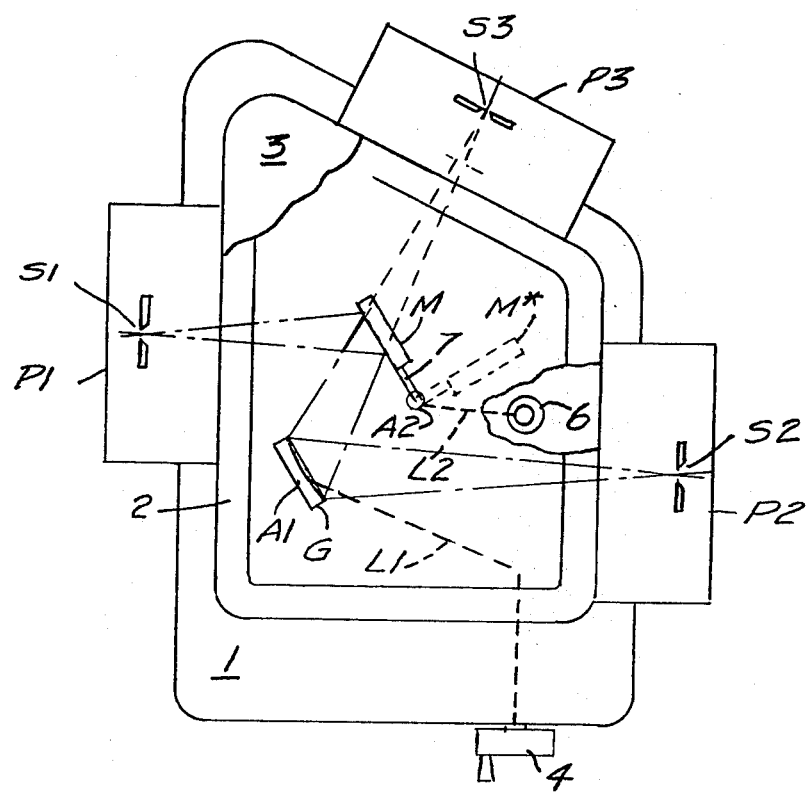
FIG. 1 is a plan view of a monochromator including a moveable mirror, according to the invention.

As shown in FIG. 1 a monochromator comprises a base 1 from which the sides of a housing 2 extend upwardly to a cover 3. For use in the vacuum ultraviolet spectral range a vacuum is drawn in the housing. The housing has three ports P1, P2, and P3, comprising slits S1, S2, and S3.

Each port may comprise an entrance slit or an exit slit so long as there is one of each. As one example port P1 comprises an entrance slit S1 for a first light source outside the port P1, and port P2 on the opposite side of the housing comprises an exit slit S2 for monochromatic light. Between the entrance and exit ports P1 and P2 a first light path is defined by a plane mirror M and a concave diffraction grating G which fold the path into parallel legs leaving the entrance slit S1 and approaching the exit slit S2. A handcrank 4 turns the grating G on its axis A1 through a linkage L1 causing the spectrum dispersed by the grating to scan the exit slit S2 in a well known manner, thereby presenting a range of narrow wavelength bands at the exit slit.

The range of wavelength bands is limited by the spectrum of the light source at the entrance slit S1. According to the present invention light may be dispersed not only from the source at slit S1 to the exit S2 on the opposite side of the housing, but also from a source, preferably of a different spectral range, at the third port P3. Normally the mirror M intercepts a second light path from the entrance slit S3 of the third port P3 to the grating G. But for use of the second light source at port P3 the mirror is swung on an arm 7 pivoted on axis A2 by turning a knob 6 connected to the arm by a linkage L2 so that the mirror moves from its solid line position M to a broken line position M* thereby completing a second path directly from the second entrance port P3 to the grating G and thence to the exit port P3. With a different light source at the second entrance port P3 a different spectral range can be presented at the exit slit S2.

As has been previously mentioned two of the ports may be used as exits and one as an entrance where, for example, it is desired to examine two different specimens at slits S1 and S3 used as exits, while slit S2 is used as an entrance.

Figure 2:
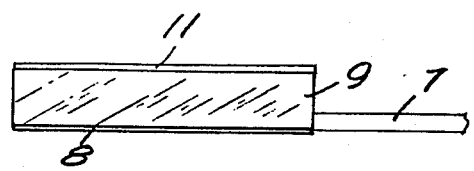
FIG. 2 is an enlarged view of the mirror of FIG. 1.

The efficiency with which the mirror M reflects a selected wavelength band is increased in two ways as shown in FIG. 2. A reflective surface 8 on a glass blank 9 may be either aluminum or a multilayer dielectric typically several layers each one quarter of the wavelength which it is desired to reflect selectively.

Additionally the mirror is provided with a second surface 11 behind the reflective coating which is highly absorptive of any light transmitted by the reflective coating.

It should be understood that the present disclosure is for the purpose of illustration only and that this invention includes all modifications and equivalents which fall within the scope of the appended claims.

I claim:

1. A monochromator comprising a housing having at least three ports including at least one entrance and one exit port; and a diffraction grating and a single reflector defining a first folded path between two of said ports on opposite sides of the housing, the reflector intercepting a second path from the third of said ports to the grating at an angle to the first path, and the reflector being moveable out of the second path to complete the second path directly to the grating and thence to one of the first two ports.

2. A monocromator according to claim 1 where in the reflector has a coating selectively primarily reflective of a narrow band of light.

3. A monochromator according to claim 1 wherein the reflector has a second surface behind the reflective coating, the second surface being highly absorptive of light transmitted by the reflective coating.

* * * * *